United States Patent
Siebel et al.

(10) Patent No.: US 7,539,564 B2
(45) Date of Patent: May 26, 2009

(54) DEVICE AND METHOD FOR CENTRAL ON-BOARD DIAGNOSIS FOR MOTOR VEHICLES

(75) Inventors: Ulrich Siebel, Berlin (DE); Frank Henecker, Lenting (DE); Andreas Breuer, Brockel (DE)

(73) Assignee: Audi AG, Ingolstadt (DE)

( * ) Notice: Subject to any disclaimer, the term of this patent is extended or adjusted under 35 U.S.C. 154(b) by 188 days.

(21) Appl. No.: 10/546,364

(22) PCT Filed: Jan. 14, 2004

(86) PCT No.: PCT/EP2004/000190

§ 371 (c)(1),
(2), (4) Date: Jul. 20, 2006

(87) PCT Pub. No.: WO2004/074048

PCT Pub. Date: Sep. 2, 2004

(65) Prior Publication Data

US 2007/0150135 A1    Jun. 28, 2007

(30) Foreign Application Priority Data

Feb. 21, 2003    (DE) ................................ 103 07 343

(51) Int. Cl.
*G01M 17/00*    (2006.01)

(52) U.S. Cl. ............................. 701/29; 701/31; 701/35; 340/438; 340/439

(58) Field of Classification Search ................... 701/29, 701/31, 35, 36, 1; 340/425.5, 438, 439
See application file for complete search history.

(56) References Cited

U.S. PATENT DOCUMENTS

| | | | |
|---|---|---|---|
| 5,056,023 A | 10/1991 | Abe | |
| 6,236,917 B1 | 5/2001 | Liebl et al. | |
| 6,407,554 B1 * | 6/2002 | Godau et al. | 324/503 |
| 7,295,903 B2 * | 11/2007 | Siebel et al. | 701/29 |

FOREIGN PATENT DOCUMENTS

| | | |
|---|---|---|
| DE | 39 26 097 | 2/1991 |
| DE | 100 13 463 | 9/2001 |
| DE | 100 51 781 | 4/2002 |
| EP | 1069422 | 1/2001 |

* cited by examiner

*Primary Examiner*—Gertrude Arthur Jeanglaud
(74) *Attorney, Agent, or Firm*—Novak Druce & Quigg LLP

(57) ABSTRACT

The aim of the invention is to improve the diagnosis of motor vehicle systems comprising a plurality of functional components in a network. To this end, the individual status data of the control units (11, 12, 13, 14) is monitored in a central diagnostic control unit (15), optionally using a mathematical model. This is advantageous in that each control unit (11, 12, 13, 14) does not have to be provided with a memory and calculation capacity for the diagnosis.

9 Claims, 1 Drawing Sheet

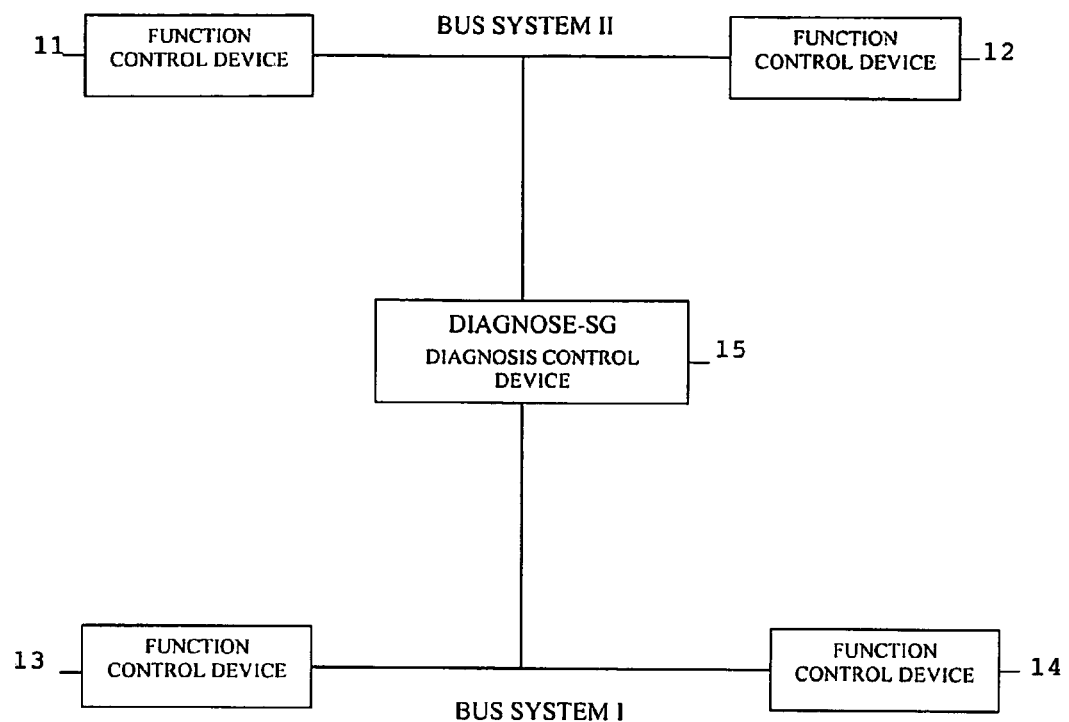

DEVICE AND METHOD FOR CENTRAL ON-BOARD DIAGNOSIS FOR MOTOR VEHICLES

This application is a § 371 application of PCT/EP2004/000190, which claims priority from DE 10307343.4, filed Feb. 21, 2003.

BACKGROUND

This invention relates to a device for on-board diagnosis for a motor vehicle system which has a plurality of control devices which are networked to one another. Furthermore this invention relates to a corresponding method for on-board diagnosis for a motor vehicle system.

Fault diagnosis of control devices and of the components of a motor vehicle controlled with them is frequently carried out solely by means of self-diagnosis by the control device itself. This means that diagnosis is limited only to the control device with the respectively controlled components. If a fault is determined by self-diagnosis, a fault message is stored in the control device. Then, the fault message is retrieved in a shop using a shop tester. Since self-diagnosis relates only to one respective control device or its controlled components, system-wide faults cannot be detected with it. But since control devices are being installed more and more in motor vehicles and are optionally networked to one another, it is increasingly important to be able to implement fault diagnosis as well in these networked systems.

The difficulty of system-wide fault diagnosis consists in that the control devices and controlled components generally originate from different manufacturers, and therefore different implementations and interpretations of specifications can occur.

A system-wide diagnosis process is known from German Published Patent Application DE 100 51 781 A1. Diagnosis takes place there in two stages, specifically component diagnosis and central system diagnosis, a system quantity and a status assigned to the system quantity being output from the component diagnosis as a result to the central system diagnosis. So-called model data of the components and of the system are stored in a function matrix. The linking of the statuses of the system quantities to operating states and the determination of faulty functions take place using a function matrix tensor. The disadvantage here is that the function control devices are greatly burdened by the diagnosis and moreover send different types of fault codes to the higher-order diagnosis unit generally in a manner specific to the control device.

SUMMARY OF THE INVENTION

The object of this invention is thus to propose a simplified on-board diagnosis process and a corresponding simplified on-board diagnosis device.

This object is achieved by a device for on-board diagnosis of a motor vehicle system which has a plurality of control devices which are networked to one another, with a recording means which can be connected to the motor vehicle system, for recording solely status data which do not contain diagnosis information from the plurality of control devices, and a computing means which is connected to the recording means for central execution of fault diagnosis for control devices and components of the motor vehicle system based on the status data.

Furthermore, a process is provided for on-board diagnosis of a motor vehicle system which has a plurality of control devices which are networked to one another, by making available only status data which do not contain diagnosis information by the plurality of control devices, and by central execution of fault diagnosis for control devices and components of the motor vehicle system based on the system data.

System-wide faults can be detected or location of faults for the overall system can be undertaken by central execution of fault diagnosis.

Furthermore it is possible, by central execution of fault diagnosis, to omit many small storage units and obviate the necessity of computer capacity in the individual control devices, and to provide the corresponding storage including the necessary computer capacity solely in the central diagnosis device. Thus it is possible to depart from the historical development path in which control devices which are provided with self-diagnosis mechanisms were always used. Rather it is now possible to easily network control devices of different suppliers to one another and to use the status data which were made available by the control devices and which do not yet contain any diagnosis on a central basis for diagnosis.

Preferably fault diagnosis is done based on a mathematical model. Model-based fault diagnosis has the advantage that overly large databases need not be stored in individual diagnosis or control devices. Furthermore, so-called unknown fault causes can also be detected by the model-based process. They are fault causes which are not covered with the known fault codes. These fault causes can be determined by the function relationships stored in the models. For example, defective components can be inferred by finding the amount of intersection of several fault symptoms or effect relationships.

Moreover model-based fault diagnosis can also recognize multiple faults which are caused by several individual faults and which cannot be easily determined by a mechanic. In addition, so-called event signal bursts which are caused by a fault and act for example on the plurality of control devices and accordingly cause numerous fault reports can also be prevented by the model-based central diagnosis.

The device, can have its own diagnosis network with which all function control devices are connected to one another exclusively for purposes of diagnosis. This diagnosis network has the advantage that diagnosis can be carried out independently of any control bus systems.

The on-board diagnosis device can be implemented as an independent device or diagnosis control device. In this way the diagnosis control device could be installed anywhere in the motor vehicle.

Alternatively, the on-board diagnosis device as claimed in the invention can also be integrated into a function control device. This version can have construction and cost-related advantages. Thus the function control device constitutes a unit which is both a function device and a diagnosis device. With such a functional unit system-wide diagnoses can then also be carried out.

In one special embodiment a motor vehicle system can be equipped with a plurality of independent on-board diagnosis devices which operate centrally for themselves. In this case, each of the devices is centrally responsible for a group of control devices which each deliver only their status data. The devices in this version are independent of one another, i.e., for purposes of diagnosis no data exchange between them takes place so that for each group inherently central fault diagnosis is carried out.

BRIEF DESCRIPTION OF THE DRAWINGS

This invention will now be detailed using the attached drawing which shows a block diagram of a motor vehicle system as claimed in this invention.

DETAILED DESCRIPTION OF THE INVENTION

The embodiments detailed below represent preferred embodiments of this invention.

The drawings reproduce a block diagram of a simplified motor vehicle system. The motor vehicle system comprises four function control devices 11, 12, 13, and 14 and one diagnosis control device 15. The function control devices 11 and 12 are connected to the diagnosis control device 15 by way of a bus system II. The function control devices 13 and 14 are conversely connected to the diagnosis control device 15 by way of a bus system I.

The function control devices 11, 12, 13, and 14 deliver all input and output data by way of the bus systems to the diagnosis control device 15. There a complete model of the motor vehicle system for fault detection runs centrally. Thus, model-based diagnosis takes place in a control device which is intended for this purpose. Using the data obtained and the model-based diagnosis, the causative fault candidates are determined in the diagnosis control device 15 for so-called out-of-order behavior, for example for overly large measurement deviations. The data recorded by the diagnosis control device 15 are pure raw data which have not been processed with respect to fault diagnosis. Rather pure status data or measurement data are delivered to the diagnosis control device 15.

A so-called diagnosis machine is integrated into the diagnosis control device 15. Using this diagnosis machine which works according to the de Kleer principle of a "general diagnostic engine" or developments based thereon and in which a vehicle-specific fault diagnosis model is loaded, the raw data or symptoms are analyzed. In the process possible fault candidates are determined.

The bus systems I and II can constitute ordinary on-board networks. As an alternative in the motor vehicle an independent diagnosis network can be connected up so that the individual function control devices have both a connection to the conventional motor vehicle bus and also a connection to a diagnosis bus. These bus systems are modeled in the diagnosis control device 15 so that the respective bus faults can also be recognized.

As one version, the diagnosis control device 15 is not made model-based, but for example knowledge-based or rule-based. In this case as well the individual control devices 11 to 14 deliver status data which are unprocessed with respect to diagnosis to the diagnosis control device 15 which centrally executes fault diagnosis.

Since not each fault cause can be recognized by self-diagnosis according to the prior art, all status data are sent from the function control devices 11 to 14 to the diagnosis control device 15, the diagnosis center. The common processing of the status data optionally with other symptom information then leads to the corresponding cause of the fault in a much more targeted manner.

The central fault diagnosis can also prevent event signal bursts which would cause numerous fault reports of the individually evaluating control devices by one fault cause. Rather such a fault is evaluated system-wide by the central evaluation of the status data so that generally an unambiguous fault cause by which several control devices are affected can be determined.

The invention claimed is:

1. On-board diagnosis method for a motor vehicle system which has a plurality of control devices which devices are networked to one another, said method comprising making available exclusively status data which do not contain diagnosis information by the plurality of control devices and centrally executing fault diagnosis for control devices and components of the motor vehicle system based on status data.

2. The process as claimed in claim 1, wherein fault diagnosis is carried out based on a mathematical model.

3. The process as claimed in claim 1, wherein fault diagnosis is carried out in a diagnosis network of the motor vehicle system which is intended for this purpose.

4. On-board diagnosis device of a motor vehicle system comprising a plurality of control devices which are networked to one another, a recording means which can be connected to the motor vehicle system, for recording solely status data which do not contain diagnosis information from the plurality of control devices, and a computing means which is connected to the recording means for central execution of fault diagnosis for control devices and components of the motor vehicle system based on the status data.

5. The device as claimed in claim 4, wherein the computing means has a mathematical model with which functional relationships of the plurality of control devices including the components controlled with them can be computed so that specific faults can be determined in a targeted manner in the motor vehicle from the status data.

6. The device as claimed in claim 4, which has its own diagnosis network with which the individual control devices of the motor vehicle system are connected to one another exclusively for purposes of diagnosis.

7. The device as claimed in claim 4, wherein the device constitutes a unit which is independent of the plurality of control devices.

8. The device as claimed in claim 4, which is integrated into one of the plurality of function control devices which are used for functional control of the individual components of the motor vehicle.

9. Motor vehicle system comprising a plurality of devices as claimed in claim 4, wherein each of the devices is centrally responsible for fault diagnosis for a group of control devices.

\* \* \* \* \*